US011243071B2

(12) United States Patent
Georgeson et al.

(10) Patent No.: US 11,243,071 B2
(45) Date of Patent: Feb. 8, 2022

(54) SUB-SURFACE PATTERNING FOR DIFFRACTION-BASED STRAIN MEASUREMENT AND DAMAGE DETECTION IN STRUCTURES

(71) Applicant: The Boeing Company, Chicago, IL (US)

(72) Inventors: Gary E. Georgeson, Tacoma, WA (US); Kenneth H. Griess, Kent, WA (US); Russell L. Keller, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/780,601

(22) Filed: Feb. 3, 2020

(65) Prior Publication Data
US 2021/0239460 A1 Aug. 5, 2021

(51) Int. Cl.
G01B 11/16 (2006.01)
G01B 15/06 (2006.01)

(52) U.S. Cl.
CPC .......... *G01B 11/165* (2013.01); *G01B 11/167* (2013.01); *G01B 15/06* (2013.01)

(58) Field of Classification Search
CPC .............................. G01B 11/165; G01B 11/18
USPC .................................................. 359/558–576
See application file for complete search history.

(56) References Cited

U.S. PATENT DOCUMENTS

| 5,399,854 A | 3/1995 | Dunphy |
| 5,430,817 A | 7/1995 | Vengsarkar |
| 5,526,449 A * | 6/1996 | Meade ................. G02B 6/1225 385/14 |
| 5,760,391 A | 6/1998 | Narendran |
| 6,075,915 A * | 6/2000 | Koops .................... B82Y 20/00 385/123 |
| 6,584,857 B1 * | 7/2003 | Furlani .................... G01L 1/24 73/800 |

(Continued)

FOREIGN PATENT DOCUMENTS

WO 2017172601 A1 10/2017

OTHER PUBLICATIONS

Search Report for related European Application No. 20211758.6; report dated Apr. 28, 2021.

*Primary Examiner* — Michael P LaPage
(74) *Attorney, Agent, or Firm* — Quinn IP Law

(57) ABSTRACT

Systems and methods for assessing strain in structural components are disclosed. Structural components may have geometric patterns of diffraction cavities within the structural component, with the diffraction cavities in the geometric pattern each having a cavity width and being spaced from each other by a cavity spacing distance. The method may include projecting beams of electromagnetic (EM) energy through the structural component to the geometric pattern of diffraction cavities to create diffracted beams of EM energy that are reflected from or transmitted through the geometric pattern of diffraction cavities and have diffracted wavelengths indicating changes in the cavity spacing distances due to strain caused when the structural component is exposed to environmental conditions, detecting the diffracted wavelength of the diffracted beams, and correlating the diffracted wavelengths of the diffracted beams to the strain in the structural components.

26 Claims, 8 Drawing Sheets

(56) References Cited

U.S. PATENT DOCUMENTS

| | | | |
|---|---|---|---|
| 6,920,290 B2 * | 7/2005 | Mitra | H01S 3/2383 |
| | | | 398/202 |
| 6,929,984 B2 * | 8/2005 | Forbes | H01L 21/3223 |
| | | | 257/E21.319 |
| 2002/0037135 A1 | 3/2002 | Atieh | |
| 2003/0026190 A1 | 2/2003 | Hendriks | |
| 2003/0111665 A1 * | 6/2003 | Geusic | G02B 6/13 |
| | | | 257/64 |
| 2003/0142319 A1 | 7/2003 | Ronnekleiv | |
| 2006/0071158 A1 | 4/2006 | Van Der Spek | |
| 2008/0151219 A1 | 6/2008 | Maris | |
| 2009/0174944 A1 * | 7/2009 | Yuasa | B29C 67/0007 |
| | | | 359/566 |
| 2009/0180185 A1 * | 7/2009 | Hayashi | G02B 5/1852 |
| | | | 359/566 |
| 2010/0245978 A1 * | 9/2010 | Baumberg | G02B 5/008 |
| | | | 359/291 |
| 2011/0226070 A1 | 9/2011 | Berendes | |
| 2011/0316712 A1 | 12/2011 | McIver et al. | |
| 2012/0325009 A1 | 12/2012 | Chung | |
| 2014/0111789 A1 * | 4/2014 | Carralero | G01D 5/266 |
| | | | 356/35.5 |
| 2015/0085364 A1 * | 3/2015 | Zhu | G02B 5/1857 |
| | | | 359/569 |
| 2015/0308907 A1 | 10/2015 | Georgeson et al. | |
| 2016/0249809 A1 | 9/2016 | Ou-Yang | |
| 2017/0052152 A1 | 2/2017 | Tat et al. | |
| 2017/0059890 A1 * | 3/2017 | Wilson | G01L 1/24 |
| 2017/0276614 A1 | 9/2017 | Bovero et al. | |
| 2018/0038744 A1 | 2/2018 | Winter et al. | |
| 2019/0310076 A1 | 10/2019 | Georgeson et al. | |
| 2020/0292302 A1 | 9/2020 | Georgeson et al. | |

* cited by examiner

SUB-SURFACE PATTERNING FOR DIFFRACTION-BASED STRAIN MEASUREMENT AND DAMAGE DETECTION IN STRUCTURES

TECHNICAL FIELD

The present disclosure relates generally to non-destructive inspection (NDI) of structural components and, more particularly, to systems and methods for detecting strain in structural components caused by exposure to environmental conditions utilizing geometric patterns of diffraction cavities within the structural components that diffract nonvisible electromagnetic (EM) energy to produce detectable variations in the wavelength of EM energy reflected or transmitted from the structural component, indicating strains in the structural components.

BACKGROUND

Many mechanical systems, such as commercial vehicles, manufacturing equipment, and other industrial systems, may be exposed to particularly energetic environmental conditions, such as vibration, temperature extremes, impacts and mechanical stresses. For example, even when on the ground, aircraft may be exposed to significant stresses during cargo loading and unloading, as well as impacts from support vehicles and ground support equipment. During flight, stresses and/or impacts may result during take-off and landing, from shifting or improperly secured cargo, from impacts with objects during flight, and the like. In addition, some structural components may experience thermal stresses when exposed to high temperatures. Some composite materials, for example, may be affected by thermal degradation, which may compromise the mechanical properties of the composite, including flexural strength, compression after impact, and inter-laminar shear strength, among others.

It is therefore common for selected components of various industrial systems to be routinely inspected and evaluated during the operational lifetime of the component. The integrity of one or more structural components may be compromised without an accompanying visually detectable indication of the effect of environmental conditions on the components. Accordingly, needs exist for non-destructive inspection techniques that can indicate cumulative effects on structural components after being exposed to environmental conditions such as repetitive loading, impacts, high temperatures and the like during operation. Such indications may lead to the scheduling of further evaluation, maintenance and/or replacement of the structural components at appropriate times.

SUMMARY OF THE DISCLOSURE

In one aspect of the present disclosure, a structural component is disclosed. The structural component may include a first outer surface, a second outer surface, and a first geometric pattern of diffraction cavities formed by first surfaces within the structural component. The first geometric pattern of diffraction cavities may have a first set of diffraction cavities spaced from each other by a first cavity spacing distance, wherein a first projected beam of EM energy having a first wavelength corresponding to the first cavity spacing distance is diffracted when the first projected beam of EM energy hits the first set of diffraction cavities and creates a first diffracted beam of diffracted EM energy having a first diffracted wavelength indicating changes in the first cavity spacing distance due to strain caused when the structural component is exposed to an environmental condition.

In another aspect of the present invention, an inspection system for assessing strain in a structural component is disclosed. The inspection system may include a first geometric pattern of diffraction cavities within the structural component having a first set of diffraction cavities spaced from each other by a first cavity spacing distance, and a first EM energy source projecting a first projected beam of EM energy at a first wavelength that corresponds to the first cavity spacing distance. When the first projected beam of EM energy is projected onto the structural component, the first projected beam of EM energy may pass through the structural component to the first geometric pattern of diffraction cavities, and may be diffracted by the first set of diffraction cavities to create a first diffracted beam of diffracted EM energy having a first diffracted wavelength indicating changes in the first cavity spacing distance due to the strain caused when the structural component is exposed to an environmental condition. The inspection system may further include an EM energy detector detecting the first diffracted wavelength of the first diffracted beam of diffracted EM energy from the first set of diffraction cavities as the first EM energy source projects the first projected beam of EM energy onto the structural component, and a processor operatively connected to the EM energy detector and configured to receive the first diffracted wavelength of the first diffracted beam of diffracted EM energy from the EM energy detector and to correlate the first diffracted wavelength to the strain in the structural component.

In a further aspect of the present disclosure, a method for assessing strain in a structural component is disclosed. The structural component may have a first geometric pattern of diffraction cavities within the structural component, the first geometric pattern of diffraction cavities having a first set of diffraction cavities each having a first cavity spacing distance. The method for assessing strain may include projecting a first projected beam of EM energy through the structural component to the first geometric pattern of diffraction cavities, wherein the first projected beam of EM energy has a first wavelength that corresponds to the first cavity spacing distance, and wherein the first set of diffraction cavities diffracts the first projected beam of EM energy to create a first diffracted beam of diffracted EM energy having a first diffracted wavelength indicating changes in the first cavity spacing distance due to strain caused when the structural component is exposed to an environmental condition. The method may further include detecting the first diffracted wavelength of the first diffracted beam of diffracted EM energy from the first set of diffraction cavities as the first projected beam of EM energy is projected onto the structural component, and correlating the first diffracted wavelength of the first diffracted beam of diffracted EM energy from the first geometric pattern of diffraction cavities to the strain in the structural component.

Additional aspects are defined by the claims of this patent.

BRIEF DESCRIPTION OF THE DRAWINGS

FIGS. 7A-7G are plan views of embodiments of geometric patterns of diffraction cavities in accordance with the present disclosure for the structural component of FIG. 1;

DETAILED DESCRIPTION

Figure 1:
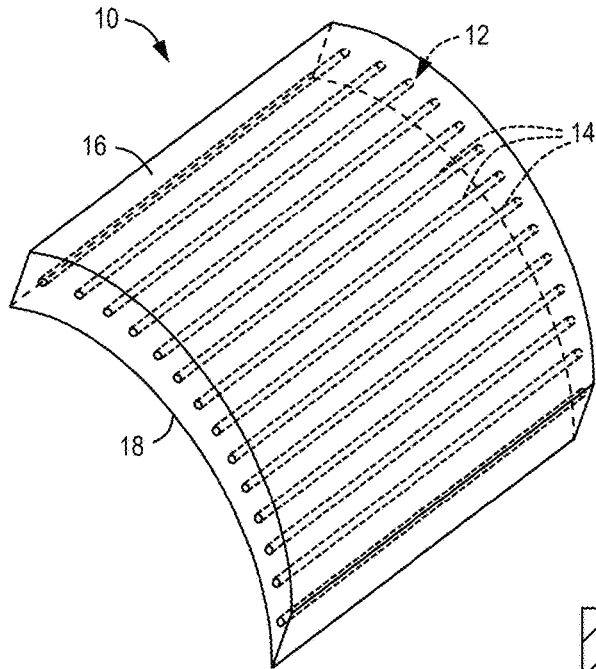
FIG. 1 is an isometric view of a structural component of a mechanical system having a geometric pattern of diffraction cavities in accordance with the present disclosure.
Figure 2:
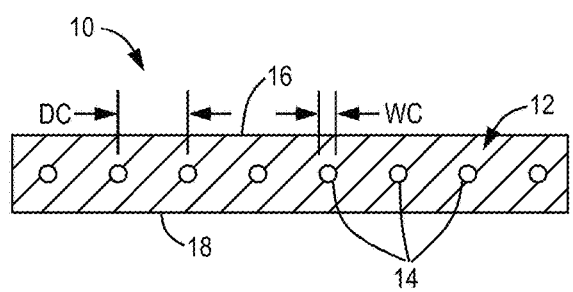
FIG. 2 is a cross-sectional view of portion of the structural component of FIG. 1 having the geometric pattern of diffraction cavities.

FIGS. 1 and 2 are illustrations of a portion of a structural component 10 of a mechanical system that is configured for application of the NDI systems and methods illustrated and described herein. The structural component 10 may be any component of a mechanical system that will be subjected to environmental conditions that can cause stresses and strains to the structural component 10. For use in the NDI systems and methods of the present disclosure, the structural component 10 includes a geometric pattern 12 of diffraction cavities 14 formed by surfaces within the interior of the structural component 10. In the illustrated embodiment, the structural component 10 has a single-layer construction in which the geometric pattern 12 of diffraction cavities 14 is defined. The structural component 10 includes a first outer surface 16, a second outer surface 18, with the geometric pattern 12 of diffraction cavities 14 disposed within the structural component 10 between the outer surfaces 16, 18. With the diffraction cavities 14 being defined within the structural component, the geometric pattern 12 is concealed from view and protected from environmental elements that could breach or otherwise damage the diffraction cavities 14.

Figure 3:
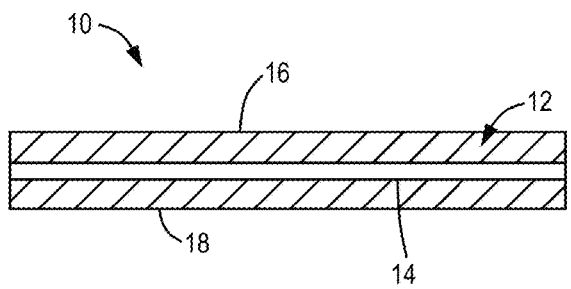
FIG. 3 is a cross-sectional view of a portion of the structural component of FIG. 1 taken from a section plane perpendicular to a section plane of FIG. 2.

FIGS. 2 and 3 illustrate the structural component 10 of FIG. 1 in cross-section. The geometric pattern 12 of diffraction cavities 14 is disposed inward from the outer surfaces 16, 18 within the structural component 10. In the illustrated embodiment, the diffraction cavities 14 are elongated cylindrical cavities that appear as circles when viewed perpendicular to the section plane of FIG. 2, and appear as linear channels within the structural component 10 when viewed perpendicular to the section plane of FIG. 3. In alternative embodiments, the diffraction cavities 14 may have other cross-sectional geometries and be shaped to conform to the structural component 10 as necessary to provide meaningful indications of strains. The diffraction cavities 14 and the geometric pattern 12 are configured to create strain-sensitive detectable variations in the wavelength of EM energy reflected from or transmitted through the geometric pattern 12 in response to having EM energy outside the visible spectrum projected thereupon. The reflected or transmitted EM energy may be detected by an appropriate detector as discussed hereinafter, and the detectable variations in the wavelength and frequency of the reflected or transmitted EM energy can be determined by a processor and compared to baseline values for EM energy wavelengths expected when the structural component 10 has not been affected by stresses and strains cause by environmental conditions. The elongated cylindrical diffraction cavities 14 of the illustrated embodiment are exemplary, and diffraction cavities in accordance with the present disclosure may have alternative geometries as necessary to provide a meaningful representation of strain experienced by a particular structural component in which diffraction cavities are implemented.

Structural components having diffraction cavities in accordance with the present disclosure may be fabricated using additive manufacturing techniques where the diffraction cavities are formed within the structural components as the structural components are constructed. Such additive manufacturing techniques can include vat photopolymerization, material jetting, binder jetting, powder bed fusion with laser sintering, material extrusion, direct energy disposition, sheet lamination, investment molding or casting and the like. These manufacturing techniques may allow the diffraction cavities to be formed in isolation within the structural components without the necessity of openings through the outer surfaces of the structural components that may be later backfilled to isolate the diffraction cavities within the structural components. However, those skilled in the art will understand that further alternative manufacturing techniques may be used in fabricating structural components with diffraction cavities in accordance with the present disclosure, and such techniques are contemplated by the inventors.

In the illustrated embodiment, the diffraction cavities 14 are arranged with a cavity width WC and a cavity spacing distance DC to create diffraction when EM energy having a corresponding wavelength is projected on the structural component 10. Acoustic boundaries are created within the structural component 10 where the internal surfaces define the diffraction cavities 14. The wavelengths of the EM energy projected onto the structural component 10 are coordinated with the cavity widths WC and the cavity spacing distances DC of the diffraction cavities 14 to facilitate determination of strains in the structural component 10 caused by exposure to environmental conditions.

The wavelengths of the projected EM energy will typically be outside the visible range of approximately 400 nm to 750 nm unless the structural component 10 is fabricated from materials that are visually transparent to EM energy in the visible range. The diffraction of the applied EM energy creates the detectable variations in the diffracted wavelength of the reflected or transmitted EM energy that vary as the cavity spacing distance DC changes due to strain in the structural component 10.

The cavity spacing distance DC, which corresponds to the center-to-center distance between adjacent diffraction cavities 14 of the geometric pattern 12, will determine an optimum spectral range of EM energy that can be applied to the geometric pattern 12. In general, the geometric pattern 12 will diffract EM energy when the cavity spacing distance DC is greater than the wavelength of the EM energy. A target value for the cavity spacing distance DC may be approximately two times the wavelength of the EM energy in some embodiments. However, the cavity spacing distance DC may be greater than or less than two times the wavelength of the EM energy depending on the requirements for a particular implementation of patterning and strain measurement in accordance with the present disclosure. These conditions are derived from the following diffraction grating equation that is known in the art:

$$d^* \sin \theta = n^* \lambda, \quad (1)$$

where d is equal to the cavity spacing distance DC between adjacent diffraction cavities 14, $\lambda$ is the wavelength of the EM energy, n is the order maxima of the diffracted EM energy that will be observed or detected, and $\theta$ is the observation angle or the angle between the incident direction of the EM energy projected onto the structural component 10 and the direction of the observed maxima. Based on Equation (1), the first order maxima (n=1) may be observed at an observation angle $\theta$ equal to approximately 30° (sin 30°=0.5) when the cavity spacing distance DC is approximately two times the wavelength $\lambda$ of the incident EM energy.

Examples of combinations of wavelengths, frequencies and cavity spacing distance DC that can be used in the system and methods of the present disclosure are as follows:

| EM Energy | Wavelength | Frequency | Cavity Spacing Distance DC |
|---|---|---|---|
| Ultraviolet | .2 μm-.4 μm | 750 THz-1,500 THz | >.2 μm-.8 μm |
| Near Infrared | .75 μm-2.5 μm | 120 THz-400 THz | >.75 μm-5.0 μm |
| Mid Infrared | 2.5 μm-15 μm | 20 THz-120 THz | >2.5 μm-30 μm |
| Far Infrared | 15 μm-1 mm | 300 GHZ-20 THz | >15 μm-2 mm |
| THz Band | .1 mm-1 mm | 300 GHz-3 THz | >.1 mm-2 mm |
| Ultrasonic | .1 mm-5 mm | 60 GHz-3 THz | >.1 mm-10 mm |
| Millimeter Wave Region | 1 mm-10 mm | 30 GHz-300 GHz | >1 mm-20 mm |
| Microwaves | 1 mm-30 cm | 1 GHz-300 GHz | >1 mm-60 cm |

Consequently, for ultrasonic EM energy in the 1 mm to 5 mm wavelength range for example, the cavity spacing distance DC may be in the same range or larger (e.g., 1 mm to 10 mm), and the diffraction cavities 14 may have a cavity width WC large enough to diffract the ultrasonic EM energy at a sufficient observation angle $\theta$ to measure a desired order maxima of the diffracted EM energy. For example, for ultrasonic EM energy having a wavelength of 1 mm, the cavity spacing distance DC may be approximately 4 mm, and the diffraction cavities 14 may have a cavity width WC equal to approximately 2 mm. The cavity spacing distance DC is approximately four times the wavelength, and Equation (1) is solved for sin $\theta$ equal to approximately 0.25 for the first order maxima, which equates to an observation angle $\theta$ of approximately 14.5°. For a structural component 10 that has a 20 mm thickness between the outer surfaces 16, 18, the first two order maxima would be separated by approximately 5 mm at the second outer surface 18 when the ultrasonic EM energy is projected onto the first outer surface 16, a separation that allows measurement of the diffracted EM energy by currently-known ultrasonic sensors.

The wavelength/cavity spacing distance DC combination can be selected such that the geometric pattern 12 will reflect or transmit EM energy having a corresponding diffracted wavelength when the EM energy is applied and the structural component 10 is not subjected to strain causing the cavity spacing distance DC to change. The sizing of the diffraction cavities 14 is also related in the wavelength/cavity spacing distance DC, as the cavity width WC must be great enough to ensure that the impedance mismatch at the boundaries will affect the propagating EM energy without compromising the structural integrity of the structural component 10. As the structural component 10 is subjected to environmental conditions causing strain, the diffracted wavelength of the reflected or transmitted EM energy from the geometric pattern 12 will progress through the EM energy spectrum to other diffracted wavelengths as the strain causes the cavity spacing distance DC to increase or decrease. Depending on the configuration of the structural component 10, the geometric pattern 12 and the environmental conditions to which the structural component 10 is exposed, changes in the cavity spacing distance DC and corresponding changes in the diffracted wavelength may be uniform across the geometric pattern 12, or can be greater in some areas indicating greater stress and strain concentrations in those areas. An amount of strain and corresponding changing cavity spacing distance DC and diffracted wavelength may be acceptable without the need for further inspection, while greater changes may indicate a need for further inspection, maintenance and/or replacement of the structural component 10. The initial cavity spacing distance DC and the wavelength may be selected such that strains in the structural component 10 meriting further inspection can be detected in a timely manner. As will be apparent to those skilled in the art from this discussion, a variety of combinations of cavity spacing distances DC, cavity widths WC and EM energy wavelengths are available for the diffraction cavities 14 and the spacing between them. So long as sufficient EM energy penetrates the structural component 10 and passes through the geometric pattern 12 of diffraction cavities 14 in accordance with the present disclosure, diffraction angles $\theta$ will be sufficient to create patterns of diffracted EM energy that can be detected and measured to indicate strains in the structural component 10.

As illustrated in FIGS. 1 and 2, the geometric pattern 12 of diffraction cavities 14 may cover the entire extent of the structural component 10, and may be approximately centered within the structural component 10. However, other configurations and locations for the geometric pattern 12 of diffraction cavities 14 are contemplated. For example, the geometric pattern 12 may be strategically positioned within the structural component 10 at locations providing the most relevant information regarding stress and strain on the structural component 10, such as in areas where high stress concentrations are to be expected. Such areas can include openings through the structural component 10 for wiring, piping, conduits and the like, corners, and bond lines where the structural component 10 is engaged by or attached to another component of the mechanical system or where a patch is applied to repair the structural component 10. In the latter areas, the geometric pattern 12 can be configured so that the geometric pattern 12 is at or close to the intersection with the other component or the patch as long as the structural integrity of the connection and the mechanical system can be maintained.

Alternative configurations of structural components with geometric patterns of diffraction cavities can diffract EM energy and reflect or transmit the diffracted EM energy. For example, the geometric pattern 12 may be modified to have a second set of elongated diffraction cavities (not shown) that are parallel to each other and approximately perpendicular to the diffraction cavities 14. The second set of diffraction cavities may be curved to follow the contour of the structural component 10 of FIG. 1. The second set of diffraction cavities may be disposed at the same depth as the diffraction cavities 14 and intersect the diffraction cavities 14, or may be deeper or shallower and not intersect the diffraction cavities 14. In some embodiments, the cavity width WC and the cavity spacing distance DC may be the same in both directions. In others, the cavity width WC and the cavity spacing distance DC of the first set of diffraction cavities 14 may be different than the cavity width WC and the cavity spacing distance DC of the second set of diffraction cavities so that different wavelengths of EM energy will be diffracted by each set of diffraction cavities. Using this approach in an aircraft fuselage, for example, the first set of diffraction cavities 14 may be configured to diffract EM energy in the near infrared band to indicate hoop strains around the fuselage, and the second set of diffraction cavities may be configured to diffract EM energy in the far infrared band to indicate tensile strains, compressive strains or torsional strains in the longitudinal direction of the fuselage. Depending on the strains to be monitored, the sets of diffraction cavities can be angled with respect to each other in orientations other than orthogonal as described herein.

The diffraction cavities 14 of the geometric pattern 12 offers flexibility in the location at which the diffracted EM energy can be detected. A portion of the diffracted EM energy is reflected back in the direction of an EM energy source while another portion is transmitted through the structural component 10 to the side opposite the EM energy source. In one embodiment, the EM energy source and an EM energy detector may be positioned on the same side of the structural component 10. EM energy transmitted by the EM energy source will pass through the structural component 10, be diffracted by the geometric pattern 12 of diffraction cavities 14, reflect back in the opposite direction and be detected by the EM energy detector. In an alternative embodiment, EM energy transmitted through one side of the structural component 10 will be diffracted at the geometric pattern 12 of diffraction cavities 14, and the diffracted EM energy is transmitted through the opposite side of the structural component 10. This allows the EM energy source and the EM energy detector to be disposed on opposite sides of the structural component 10. This arrangement may be advantageous in limited access inspection situations. A beam of EM energy can be generated by an appropriately sized transmitter located within, or manually or automatically directed into, a hard-to-reach space, and the diffracted EM energy may be detected from the accessible side of the structural component 10. Of course, the positions of the EM energy source and the EM energy detector may be reversed depending on the requirements for a particular implementation.

Figure 4:
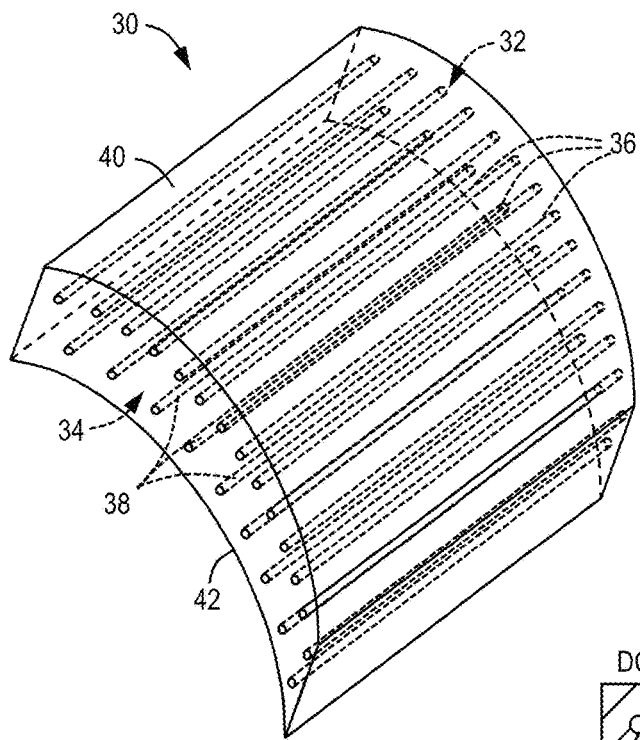
FIG. 4 is an isometric view of an alternative embodiment of structural component of a mechanical system having and multiple geometric patterns of diffraction cavities in accordance with the present disclosure.
Figure 5:
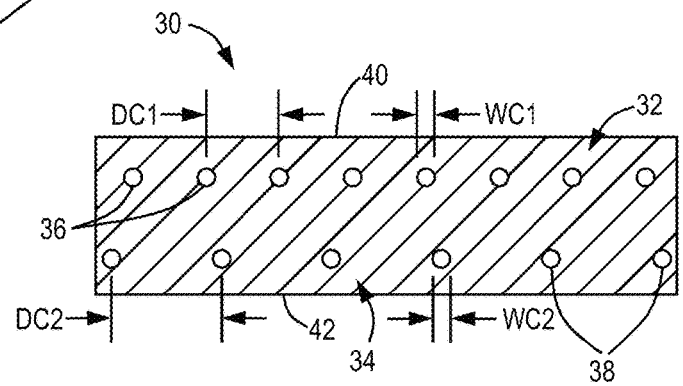
FIG. 5 is a cross-sectional view of a portion of the structural component of FIG. 4 having an exemplary configuration of multiple geometric patterns of diffraction cavities.

FIGS. 4 and 5 illustrate an alternative embodiment of a structural component 30 having multiple geometric patterns 32, 34 of grooves 36, 38 at varying depths to provide strain indications at different depths within the structural component 30. The structural component 30 may include a first outer surface 40 and a second outer surface 42 opposite the first outer surface 40. As illustrated, the diffraction cavities 36 of the first geometric pattern 32 and the diffraction cavities 38 of the second geometric pattern 34 are aligned in the same direction, but the second diffraction cavities 38 of the second geometric pattern 34 could be oriented in a second direction in a similar manner as discussed above. With the overlapping arrangement, cavity widths WC1, WC2 and cavity spacing distances DC1, DC2 for the diffraction cavities 36, 38, respectively, as shown will be selected so that the EM energy that would be diffracted by the second geometric pattern 34 of diffraction cavities 38 will pass through the first geometric pattern 32 of diffraction cavities 36 without diffraction so that meaningful strain measurements can be obtained. Generally, low frequency EM energy with longer wavelengths may penetrate deeper into the structural component 30 than higher frequency EM energy with shorter wavelengths. Consequently, in an illustrative example, the second geometric pattern 34 of diffraction cavities 38 may be configured to diffract EM energy in the terahertz, microwave or ultrasonic bands, and the first geometric pattern 32 of diffraction cavities 36, being nearer to the first outer surface 40, may be configured to diffract higher frequency EM energy in the ultraviolet or infrared bands. With this configuration, the cavity spacing distance DC1 of the diffraction cavities 36 of the first geometric pattern 32 is set such that terahertz, microwave and ultrasonic bands of EM energy can pass the diffraction cavities 36 on the way to the second geometric pattern 34 without diffraction. Penetration through the structural component 30 for either type of EM energy can be enhanced by increasing the intensity of the EM energy projected onto the structural component 30. In alternative embodiments, the geometric patterns 32, 34 may be located in non-overlapping areas of the structural component 30 so that the EM energy for one geometric pattern 32, 34 does not encounter the other geometric pattern 32, 34 as the EM energy passes through the structural component 30.

Figure 6:
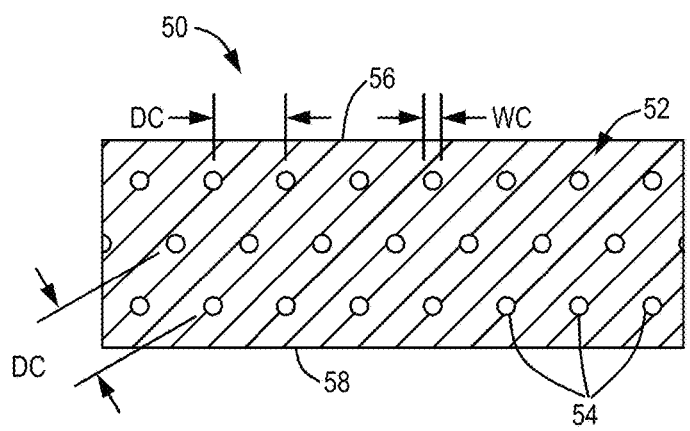
FIG. 6 is a cross-sectional view of a portion of a further alternative embodiment of a structural component having an exemplary configuration of a three-dimensional geometric pattern of diffraction cavities in accordance with the present disclosure.

FIG. 6 illustrates a further exemplary embodiment of a structural component 50 having a three-dimensional (3D) geometric pattern 52 of diffraction cavities 54. Between a first outer surface 56 and a second outer surface 58 of the structural component 50, the diffraction cavities 54 are arranged in a plurality of rows at different depths within the structural component 50. Each row is aligned with the adjacent rows so that the corresponding diffraction cavities 54 are aligned in a row. In this embodiment, each row of diffraction cavities 54 may be spaced from the adjacent rows by the same cavity spacing distance DC so that a given diffraction cavity 54 is spaced from each of four adjacent diffraction cavities 54 by the cavity spacing distance DC. The 3D geometric pattern 52 allows for the applied EM energy having the corresponding wavelength to have stronger effect in producing diffracted EM energy and indication strain in the structural component 50. In alternative embodiments, alternating rows of diffraction cavities 54 may be offset laterally so that the diffraction cavities 54 are not aligned one behind another as shown in FIG. 6. In such embodiments, each diffraction cavity 54 is spaced from each of six adjacent diffraction cavities 54 by the same cavity spacing distance DC. This type of 3D geometric pattern also allows for the applied EM energy to have stronger effect in producing diffracted EM energy and indication strain in the structural component 50. Moreover, the 3D geometric pattern 52 may allow for directing the transmitted EM energy from a direction other than perpendicular to the outer surfaces 56, 58 and producing a meaningful response indicative of strain in the structural component 50.

The elongated diffraction cavities 14, 36, 38, 54 illustrated and described herein are exemplary, and diffraction cavities having other geometric configurations are contemplated. For example, geometric patterns may be formed by spherical cavities diffraction cavities arranged in two-dimensional (2D) or 3D arrays. The cavity spacing distances DC between the spherical diffraction cavities and the cavity widths CW or cavity diameters of the spherical diffraction cavities will be similar to that discussed above for the elongated cylindrical diffraction cavities to create boundaries within a structural component that will diffract EM energy having a corresponding wavelength. The spherical diffraction cavities may have a consistent cavity spacing distance DC in both directions in a 2D geometric pattern or in all three directions in a 3D geometric pattern so that EM energy of one wavelength will be diffracted to reveal strains in each direction. Alternatively, the spherical diffraction cavities may have different cavity spacing distances DC in each direction so that evaluation of each corresponding strain will be evaluated using EM energy with a different wavelength. For example, a 3D pattern of spherical diffraction cavities may be implemented in a cylindrical object such as a pipe or housing that may be subjected to internal pressure by a gas or other pressurized fluid. The 3D geometric pattern of spherical diffraction cavities may have a first cavity spacing distance DC in the axial direction that will diffract EM energy at a first wavelength to indicate axial strains, a second cavity spacing distance DC in the circumferential direction that will diffract EM energy at a second wavelength to indicate hoop strains, and a third cavity spacing distance DC in the radial direction that will diffract EM energy at a third wavelength to indicate radial strains. Other configurations of 2D and 3D geometric patterns of spherical diffraction cavities are contemplated depending on the geometry of a particular structural component and the strains to which the structural component will be subjected.

Figure 7G:
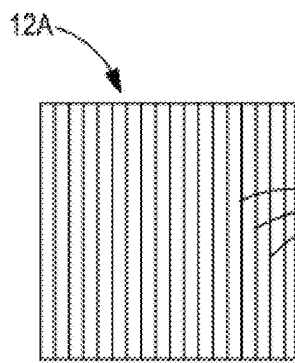
Figure 7G:
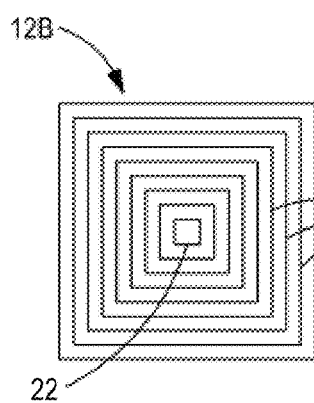
Figure 7G:
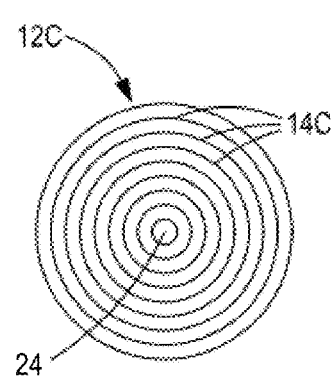
Figure 7G:
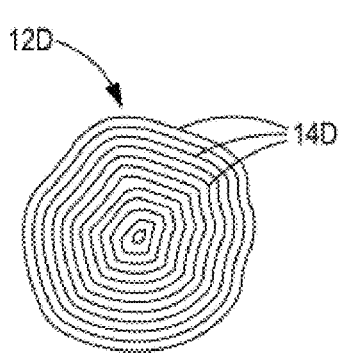
Figure 7G:
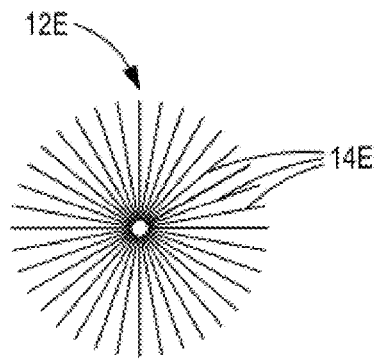
Figure 7G:
Figure 7G:
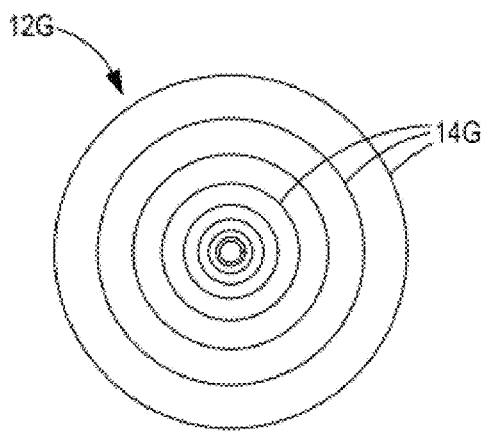

An appropriate geometric pattern for a structural component may be dictated by the characteristics of the structural component, the environmental conditions anticipated to be encountered by the structural component, development testing results, experience with the structural component in the field and other factors. FIGS. 7A-7G provide several examples of geometric patterns 12A-12G that may be created within a structural component as appropriate. FIG. 7A illustrates an exemplary one-dimensional geometric pattern 12A formed by a series of parallel linear diffraction cavities 14A. The geometric pattern 12A may be implemented in a planar structure that is subjected to tension or compression in one direction. The linear geometric pattern 12A may also be appropriate for a cylindrical structural component such as a pipe (not shown) that may be subjected to circumferential or hoop strains, but minimal strains in an axial direction. The geometric pattern 12A may wrap around the cylindrical structural component with the diffraction cavities 14A aligned parallel to a longitudinal axis of the structural components such that strain due to hoop strains will increase the circumferential cavity spacing distance DC between the diffraction cavities 14A.

FIG. 7B illustrates an example of a two-dimensional geometric pattern 12B formed by a plurality of square or rectangular diffraction cavities 14B. The square or rectangular diffraction cavities 14B define increasing areas, and are arranged concentrically to form the geometric pattern 12B with the diffraction cavities 14B of adjacent squares or rectangles being separated by the same cavity spacing distance DC. The rectangular geometric pattern 12B may have use, for example, in a structural component 10 having a rectangular opening 22 passing there through. FIG. 7C illustrates an alternative two-dimensional geometric pattern 12C formed by a plurality of concentric circular diffraction cavities 14C defining increasing areas. The concentric circles may be sized so that the diffraction cavities 14C of adjacent circles are separated by the same cavity spacing distance DC. The circular geometric pattern 12C may have application in a structural component 10 where stress on the structural component 10 may be directed radially outward from a point at the center of the geometric pattern 12C. FIG. 7D illustrates a further example of a geometric pattern 12D having concentric diffraction cavities 14D with a more complex geometric shape that may correspond to a shape of an opening or other component extending from the structural component 10. Additional irregular shapes are contemplated based on the needs of a particular implementation in the structural component 10.

FIG. 7E illustrates a further alternative two-dimensional geometric pattern 12E having a plurality of diffraction cavities 14E extending radially outward from a central point 24. The geometric pattern 12E may be an alternative to the geometric pattern 12C where circumferential stresses are more prevalent than radial stresses. FIG. 7F illustrates a geometric pattern 12F formed by a plurality of parallel curved diffraction cavities 14F. The curved diffraction cavities 14F may follow a contour of a component having a curved shape extending through the structural component 10 such as an aircraft wing.

In some implementations, the structural component 10 may have areas of interest where it may be desirable to have greater sensitivity to strain and changes in the cavity spacing distance DC. In such situations, areas of interest may be distinguished by varying the cavity spacing distances DCs between the diffraction cavities 14 and the wavelength across the structural component 10. FIG. 7G illustrates a geometric pattern 12G that is a modification of the circular geometric pattern 12C of FIG. 7C wherein the cavity spacing distance DC between adjacent diffraction cavities 14G increases as the geometric pattern 12G extends outward from the center where it may be more critical to closely inspect the radial stresses. The area with the smaller cavity spacing distance DC and correspondingly higher concentration of diffraction cavities 14G may be more sensitive to strain and changes in the cavity spacing distance DC and produce a more intense response in the diffracted wavelength of the reflected or transmitted EM energy to the projected EM energy in the area of interest than at the area with greater cavity spacing distance DC and spaced out remote diffraction cavities 14G.

As another alternative that may provide a smarter strain indicator, the geometric pattern 12 may have sets of diffraction cavities 14 laid down at angles relative to each other with different cavity spacing distance DC to independently monitor different levels or types of strain occurring in the structural component. For example, the geometric patterns 12C, 12E may be combined into a single geometric pattern 12 on the structural component. The circular geometric pattern 12C may be created with the cavity spacing distance DC being within the range responsive to ultraviolet EM energy and the geometric pattern 12E created overlying the geometric pattern 12C with the cavity spacing distance DC being within the range responsive to mid infrared EM energy. During inspection, the radial strains can be interrogated by projecting ultraviolet EM energy at the structural component, and the circumferential strains can be interrogated by projecting mid infrared EM energy at the structural component. Alternative or additional geometric patterns 12 such as those illustrated and described herein can further be created within the structural component with varying cavity spacing distance DC and corresponding wavelengths of EM energy to inspect for additional strain patterns as necessary in a particular implementation.

Figure 8:
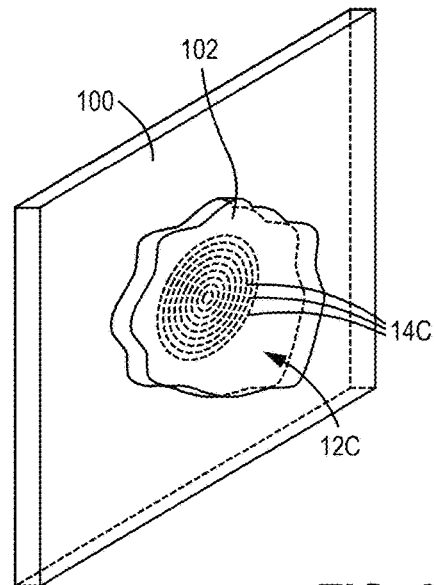
FIG. 8 is an isometric view of a portion of a structural component with a patch installed thereon having a geometric pattern of diffraction cavities in accordance with the present disclosure.

FIG. 8 illustrates an implementation where a structural component 100 has a patch 102 applied over a damaged area. The patch 102 is appropriately shaped to cover the damaged area, and is affixed to the structural component 100 via rivets, welds, adhesive, lamination or other appropriate attachment means. The patch 102 includes, for example, the geometric pattern 12C of FIG. 7C at or close to the bond line between the structural component 100 and the patch 102. The patch 102 may be fabricated by additive manufacturing. The diffraction cavities 14C of the geometric pattern 12C may be disposed slightly below the surface that faces and engages the structural component 100 to allow full surface-to-surface contact between the structural component 100 and the patch 102. Alternatively, the diffraction cavities 14C may be formed in the surface of the patch 102 such that the surface of the structural component 100 closes open sides of the diffraction cavities 14C if the integrity of the bondline is not compromised. After the patch 102 is installed, it may be inspected according to the systems and methods disclosed herein. In addition to detecting strains in the patch 102, the inspection may provide evaluation of the integrity of the application of the patch 102 to the structural component 100. If the patch 102 is properly applied and attached to the structural component 100, stresses in the structural component 100 will be transmitted to the patch 102 and corresponding strain will appear during the inspection. If the patch 102 is not properly applied and conditions such as delamination are present, the stresses may not be transferred and the inspection of the patch 102 will reveal less strain in the patch 102 than expected. Such results may prompt further investigation and reapplication of the patch 102 over the damaged area.

Figure 9:
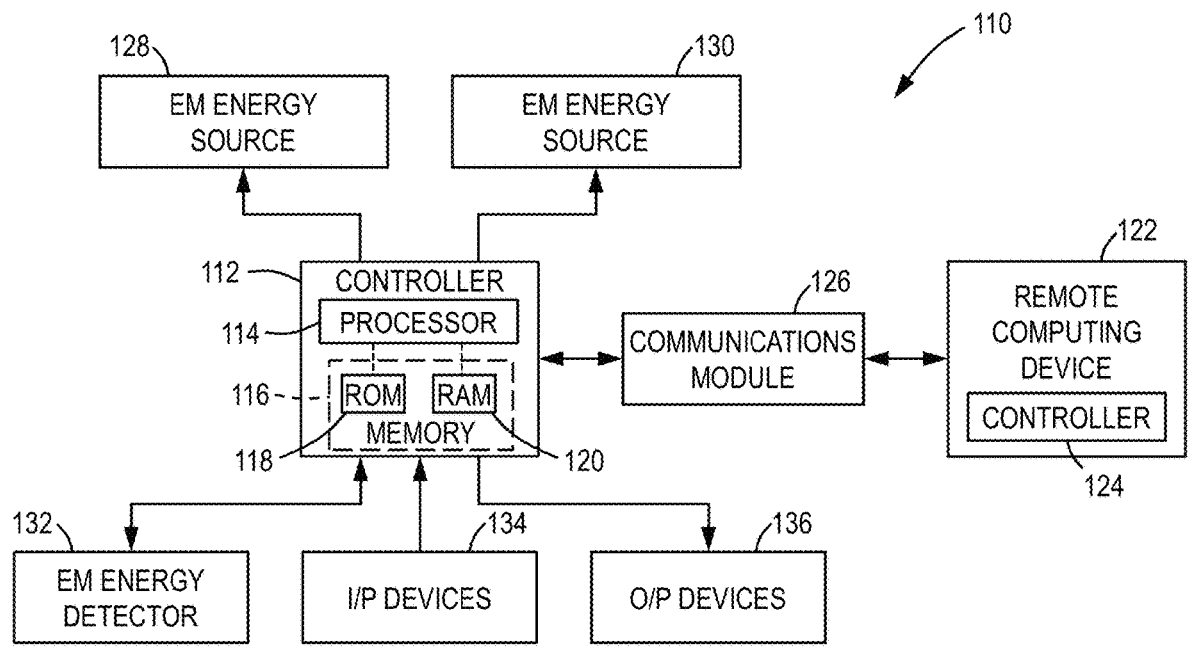
FIG. 9 is a block diagram of electrical and control components that may implement structural component inspection in accordance with the present disclosure.

The geometric patterns 12 illustrated and described herein may be incorporated into an inspection system 110 for assessing strain in structural components such as the structural component 10. FIG. 9 illustrates an exemplary arrangement of electrical and control components that may be integrated in the inspection system 110 in accordance with the present disclosure that may determine strain in the structural component 10, for example. A controller 112 may be capable of processing information received from monitoring and control devices using software stored at the controller 112, and outputting command and control signals to devices of the inspection system 110. The controller 112 may include a processor 114 for executing a specified program, which controls and monitors various functions associated with the inspection system 110. The processor 114 may be operatively connected to a memory 116 that may have a read only memory (ROM) 118 for storing programs, and a random access memory (RAM) 120 serving as a working memory area for use in executing a program stored in the ROM 118. Although the processor 114 is shown, it is also possible and contemplated to use other electronic components such as a microcontroller, an application specific integrated circuit (ASIC) chip, or any other integrated circuit device.

While the discussion provided herein relates to the functionality of the inspection system 110, the controller 112 may be configured to control other aspects of operation of other systems. Moreover, the controller 112 may refer collectively to multiple control and processing devices across which the functionality of the inspection system 110 and other systems may be distributed. For example, portions of the functionality of the inspection system 110 may be performed at a remote computing device 122 having a controller 124 that is operatively connected to the controller 112 by a communications module 126 of the inspection system 110. The remote computing device 122 may be located in the centralized location for an enterprise utilizing the inspection system 110 to perform inspections on mechanical systems. The controllers 112, 124 may be operatively connected to exchange information as necessary to control the operation of the inspection system 110. Other variations in consolidating and distributing the processing of the controllers 112, 124 as described herein are contemplated as having use in inspection systems 110 in accordance with the present disclosure.

The inspection system 110 may further include one or more EM energy sources 128, 130 capable of projecting EM energy at predetermined wavelengths corresponding to the cavity spacing distance DC of the diffraction cavities 14 in the geometric pattern 12 for example. The EM energy sources 128, 130 may receive control signals from the processor 114 causing the EM energy sources 128, 130 to project EM energy at predetermined wavelengths. In some embodiments, each EM energy source 128, 130 may be capable of projecting EM energy at one wavelength. In alternative embodiments, each EM energy source 128, 130 or a single EM energy source may be capable of projecting EM energy at different wavelengths. While the EM energy sources 128, 130 are illustrated and described as being operatively connected to the processor 114, those skilled in the art will understand that the EM energy sources 128, 130 may be standalone devices having associated input devices such as on/off switches, wavelength selection inputs and the like for manual control of the operation by personnel performing an inspection.

The inspection system 110 also may include an EM energy detector 132 operatively connected to the processor 114. The EM energy detector 132 may be any device capable of detecting the diffracted wavelength of the EM energy reflected or transmitted from the geometric pattern 12 when EM energy from the EM energy sources 128, 130 is projected onto the geometric pattern 12. In the embodiments illustrated herein, the EM energy detector 132 may be an optical detector capable of detecting the diffracted wavelength of the reflected or transmitted EM energy. For example, the EM energy detector 132 may be a charge-coupled device (CCD) camera, a video camera, photographic film or other EM energy-sensing apparatus. When activated by the processor 114 or manually actuated by appropriate input devices, the EM energy detector 132 can capture the diffracted EM energy and transmit a representation of the detected diffracted wavelengths of the diffracted EM energy to the processor 114. Once received, the processor 114 may store the diffracted wavelengths in the memory 116. Those skilled in the art will understand that detection of the wavelengths or frequencies of the diffracted EM energy and determinations of variations in the diffracted wavelengths or frequencies may be achieved using alternative mechanisms as desired or necessitated by a particular implementation of the systems and methods described herein, and the use such alternative mechanisms is contemplated by the inventors. It should be understood that use of any other mechanisms for detection and analysis of the diffracted wavelengths of the diffracted EM energy has equal application in the systems and methods of the present disclosure.

The inspection system 110 may have one or more input (I/P) devices 134 adjustable by an operator to control the inspection process. The input device 134 can include switches, buttons, keyboards, mice, touchscreens and the like capable of receiving input commands from an operator. Output (O/P) devices 136, such as monitors, screens, touchscreens, speakers, printers and the like may convey information from the inspection system 110 to the operator.

Figure 10:
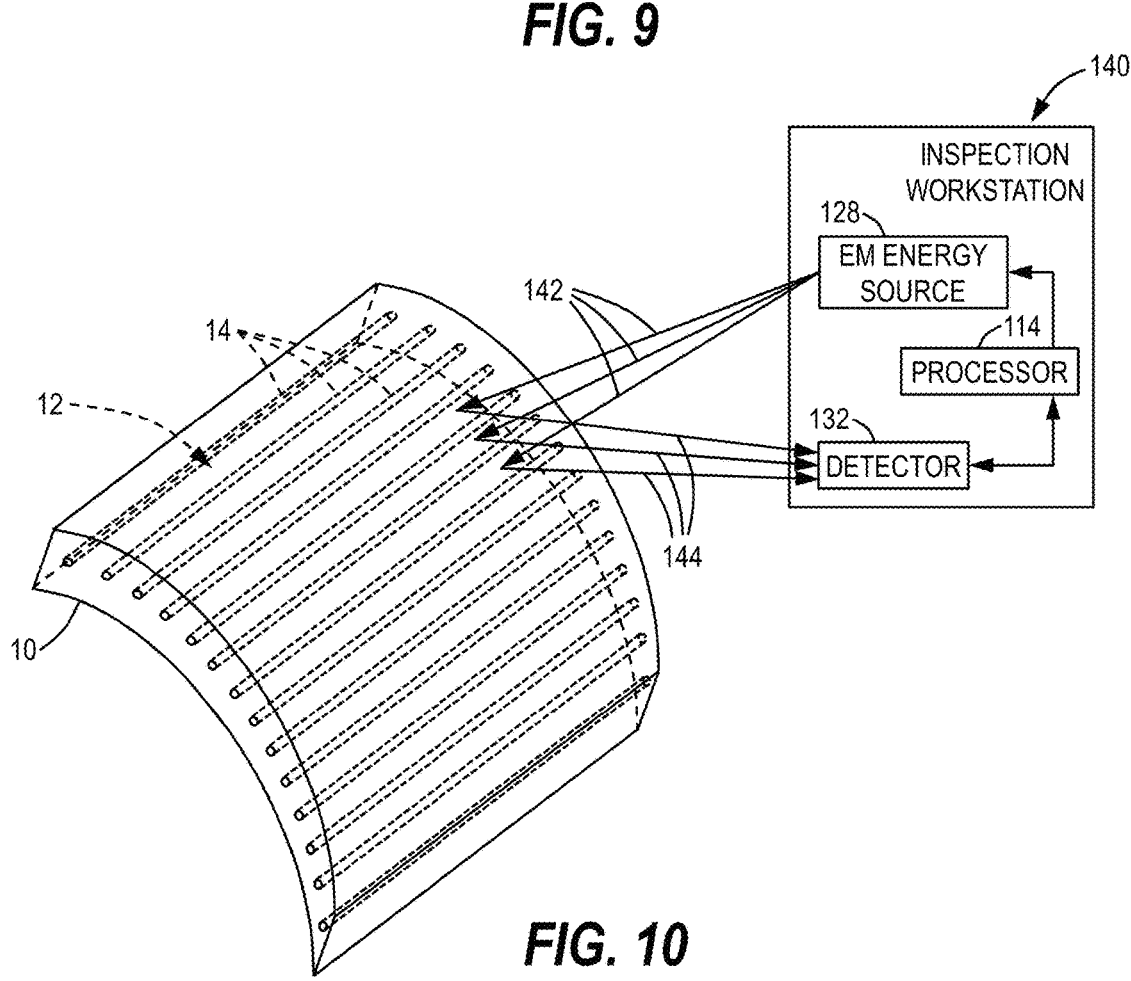
FIG. 10 is a schematic illustration of an exemplary implementation of an inspection system and inspection method in accordance with the present disclosure on the structural component of FIG. 1.

An exemplary implementation of the inspection system 110 is illustrated in FIG. 10. The processor 114, the EM energy source 128 and the EM energy detector 132 are integrated in an inspection workstation 140. The inspection workstation 140 may be, for example, a workstation at a maintenance facility for the mechanical system of which the structural component 10 is a part. With the structural component 10 disposed at the inspection workstation 140, the EM energy source 128 may be activated to project one or more beams 142 of EM energy at the appropriate wavelength onto the geometric pattern 12. The projected beams 142 are diffracted and reflected by the geometric pattern 12 to produce beams 144 of diffracted EM energy. The EM energy detector 132 receives and detects the beams 144 of diffracted EM energy, and transmits the detected EM energy to the processor 114 for analysis and correlation of the detected diffracted wavelengths or frequencies of the reflected beams 144 of EM energy into corresponding strain values. The processor 114 may be programmed with algorithms known in the art for performing the conversion of the detected wavelengths or frequencies into strain values.

Figure 11:
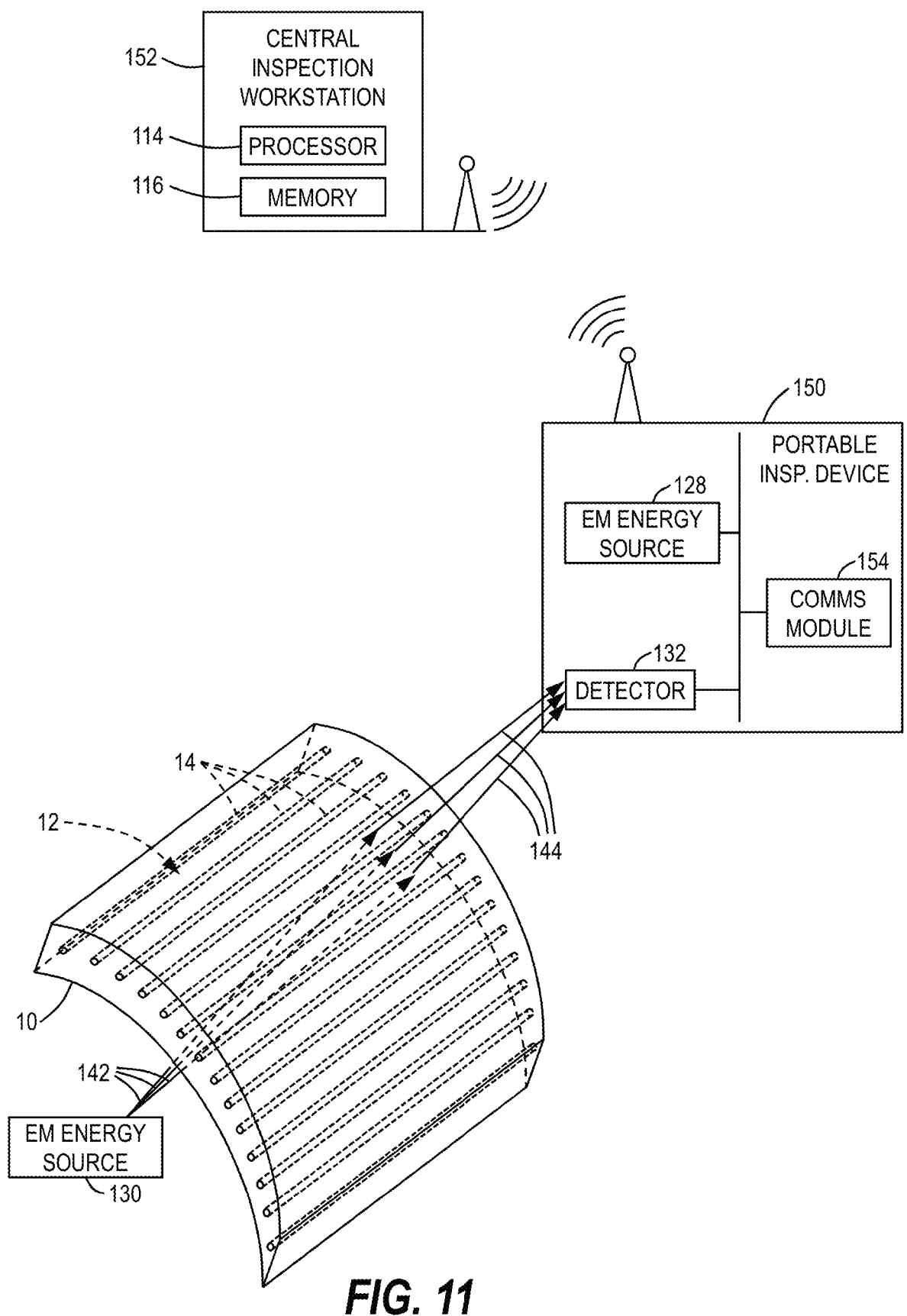
FIG. 11 is a schematic illustration of an alternative exemplary implementation of the inspection system and inspection method on the structural component of FIG. 1.

FIG. 11 illustrates an alternative implementation of the inspection system 110 where the EM energy source 128 and the EM energy detector 132 are components of a portable inspection device 150, and the processor 114 and the memory 116 are located at a central inspection workstation 152. The portable inspection device 150 may be a laptop computer, a tablet, a smart phone, a personal digital assistant or other portable processing device. The portable inspection device 150 may further include a communications module 154 capable of wireless communications with the communications module 126 at the central inspection workstation to transmit the detected colors from the EM energy detector 132. The EM energy may be projected from the EM energy source 128 and detected by the EM energy detector 132 in a similar manner as illustrated and described for FIG. 10.

FIG. 11 further illustrates an implementation where the EM energy source 130 is positioned on the opposite side of the structural component 10 from the portable inspection device 150. The EM energy source 130 may be permanently mounted within a hard-to-reach location within the mechanical system. As shown, the EM energy source 130 may project beams 142 of EM energy onto the structural component 10 and the geometric pattern 12. The EM energy is diffracted by the diffraction cavities 14 at the geometric pattern 12 and transmitted through the structural component 10 in beams 144. The beams 144 of diffracted EM energy are received at the EM energy detector 132 on the opposite side of the structural component 10 and processed by the processor 114.

Figure 12:
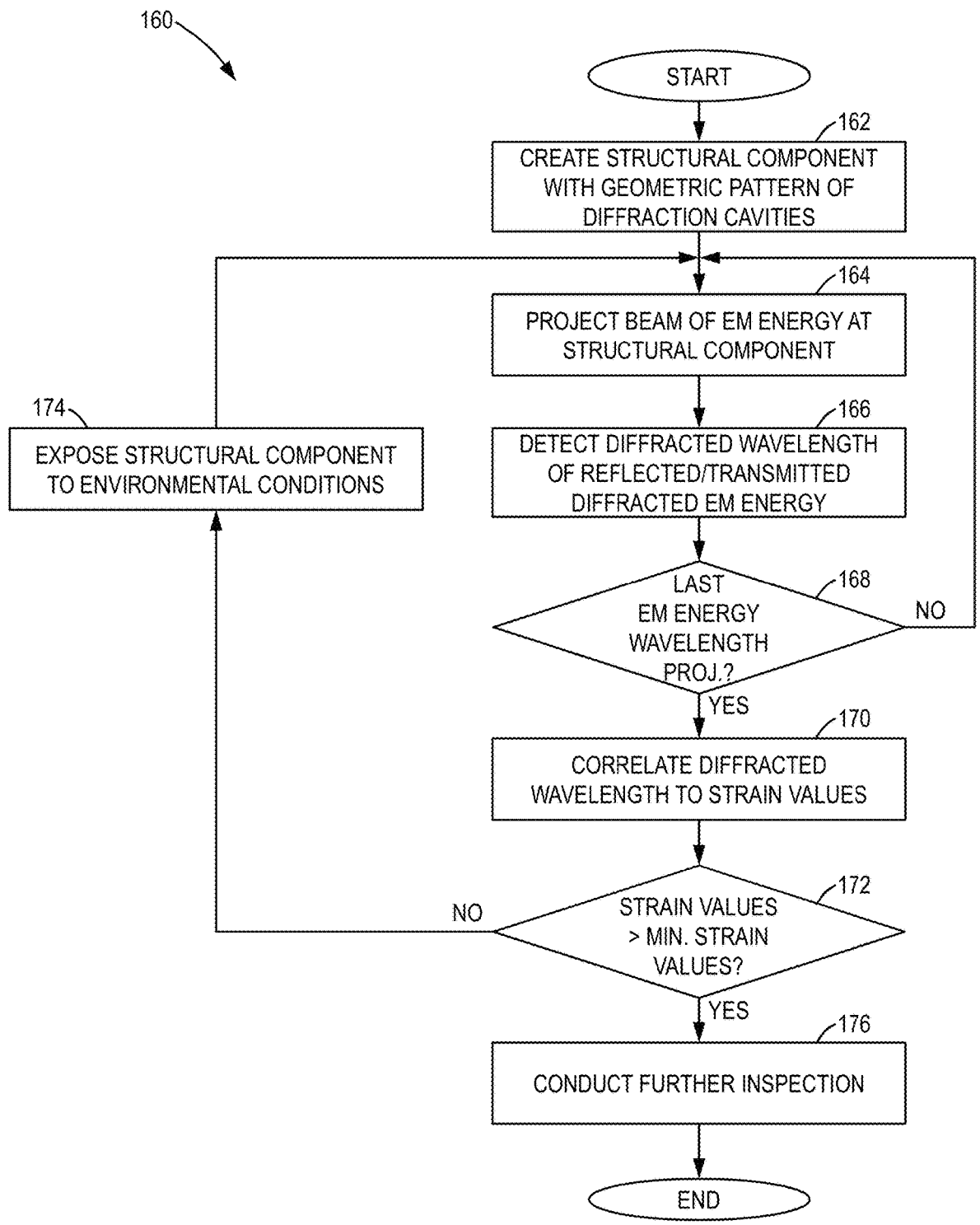
FIG. 12 is a flow diagram of an embodiment of an inspection routine in accordance with the present disclosure.

FIG. 12 illustrates a flow diagram of an exemplary inspection routine 160 that may be performed on the structural components 10, 30, 50, 100 by the inspection system 110. The routine 160 may begin at a block 162 where the structural component 10, 30, 50, 100 is created (e.g. fabricated) with one or more of the geometric patterns 12, 12A-12G of diffraction cavities 14, 14A-14G created within the structural component 10, 30, 50, 100. The diffraction cavities 14, 14A-14G may be formed in the structural component 10, 30, 50, 100 using any appropriate manufacturing technique such as those described above for example. After the structural component 10, 30, 50, 100 is created with the geometric pattern 12, 12A-12G, control may pass to a block 164 where the EM energy source 128 projects the beams 142 of EM energy with the corresponding wavelength at the structural component 10, 30, 50, 100 and onto the geometric pattern 12, 12A-12G. The EM energy in the projected beams 142 is diffracted by the diffraction cavities 14, 14A-14G, and corresponding EM energy with diffracted wavelengths is reflected or transmitted from the geometric pattern 12, 12A-12G. The reflected or transmitted beams 144 of EM energy may have diffracted wavelengths that vary at different locations on the geometric pattern 12, 12A-12G due to changes in the cavity width WC caused by strain on the structural component 10, 30, 50, 100.

With the beams 142 of EM energy projected onto the geometric pattern 12, 12A-12G and being diffracted and reflected or transmitted, control may pass to a block 166 where the EM energy detector 132 detects the diffracted wavelengths of the reflected or transmitted beams 144 of diffracted EM energy. The diffracted wavelengths of the beams 144 of EM energy may be temporarily stored or permanently stored in the memory 116.

After the diffracted beams 144 of EM energy are detected, control may pass to a block 168 where the inspection system 110 may determine whether EM energy with a last EM energy wavelength has been projected onto the geometric pattern 12, 12A-12G. As discussed above, some implementations may have a first set of diffraction cavities 14, 14A-14G with a first cavity spacing distance DC1 onto which the EM energy source 128 projects the beams 142 of EM energy with a first wavelength, and a second set of diffraction cavities 14, 14A-14G with a second cavity spacing distance DC2 onto which the EM energy source 128 projects the beams 142 of EM energy with a second wavelength. In these implementations, it may be necessary to project the beams 142 with one wavelength at a time. Consequently, if it is determined at the block 168 that beams 142 of EM energy having the various wavelengths have not been projected onto the geometric pattern 12, 12A-12G, control may pass back to the blocks 164, 166 to project EM energy from the EM energy source 128, 130 with a different one of the wavelengths onto the geometric pattern 12, 12A-12G and detect the corresponding diffracted wavelengths in the beams 144 of EM energy for the next projected beams 142 as described above.

If beams 142 of EM energy with all the necessary wavelengths have been projected and the diffracted beams 144 of EM energy have been detected at the block 168, control may pass to a block 170 to correlate the diffracted wavelengths of the beams 144 to strain values in the structural component 10, 30, 50, 100. As discussed above, the processor 114 may be programmed with algorithms known in the art for correlating the wavelengths of the EM energy in the diffracted beams 144 into strain values.

After the strain values are determined for the diffracted beams 144 of EM energy at the block 170, control may pass to a block 172 to determine whether any of the strain values calculated from the diffracted wavelengths in the diffracted beams 144 of EM energy exceeds a predetermined minimum strain value above which further inspection or maintenance should be performed. As discussed, certain levels of strain are acceptable in a structural component 10, 30, 50, 100. As an alternative, the current strain value may be compared to baseline strain values obtained for the structural component 10, 30, 50, 100 before the mechanical system is placed in service and exposed to environmental conditions. The baseline strain values in the geometric pattern 12, 12A-12G can be established by projecting the beams 142 on the structural component 10, 30, 50, 100 when no strain is placed on the structural component 10, 30, 50, 100, or when a known strain is placed on the structural component 10, 30, 50, 100 to determine the diffracted wavelengths in the beams 144 in response. In other embodiments, a portion of the geometric pattern 12, 12A-12G may be applied in an area that will not experience strains during exposure to the environmental conditions, and the diffracted wavelengths from the non-strained area may establish real-time dynamic baselines at the time the inspection is performed.

A comparison may be made between the current strain values and the baseline or other previously determined strain values to determine whether the current strain values differ from the previous strain values by more than a minimum amount or percentage. If the strain values are not greater than the minimum strain value and further inspection is not otherwise required, control may pass to a block 174 where the structural component 10, 30, 50, 100 is exposed to environmental conditions. The exposure may come from normal use in the normal environment of the mechanical system. Where the mechanical system is in a development stage, the environmental conditions may be applied in a test environment. After the exposure at the block 174, control may pass back to the block 164 to initiate another instance of inspecting the structural component 10, 30, 50, 100. Strain values being greater than the minimum strain value at the block 172 can indicate that further inspection, maintenance or replacement of the structural component 10, 30, 50, 100 may be necessary. If strain values are greater than the minimum strain value at the block 172, control passes to a block 176 to conduct further inspection of the structural component 10, 30, 50, 100.

Figure 13:
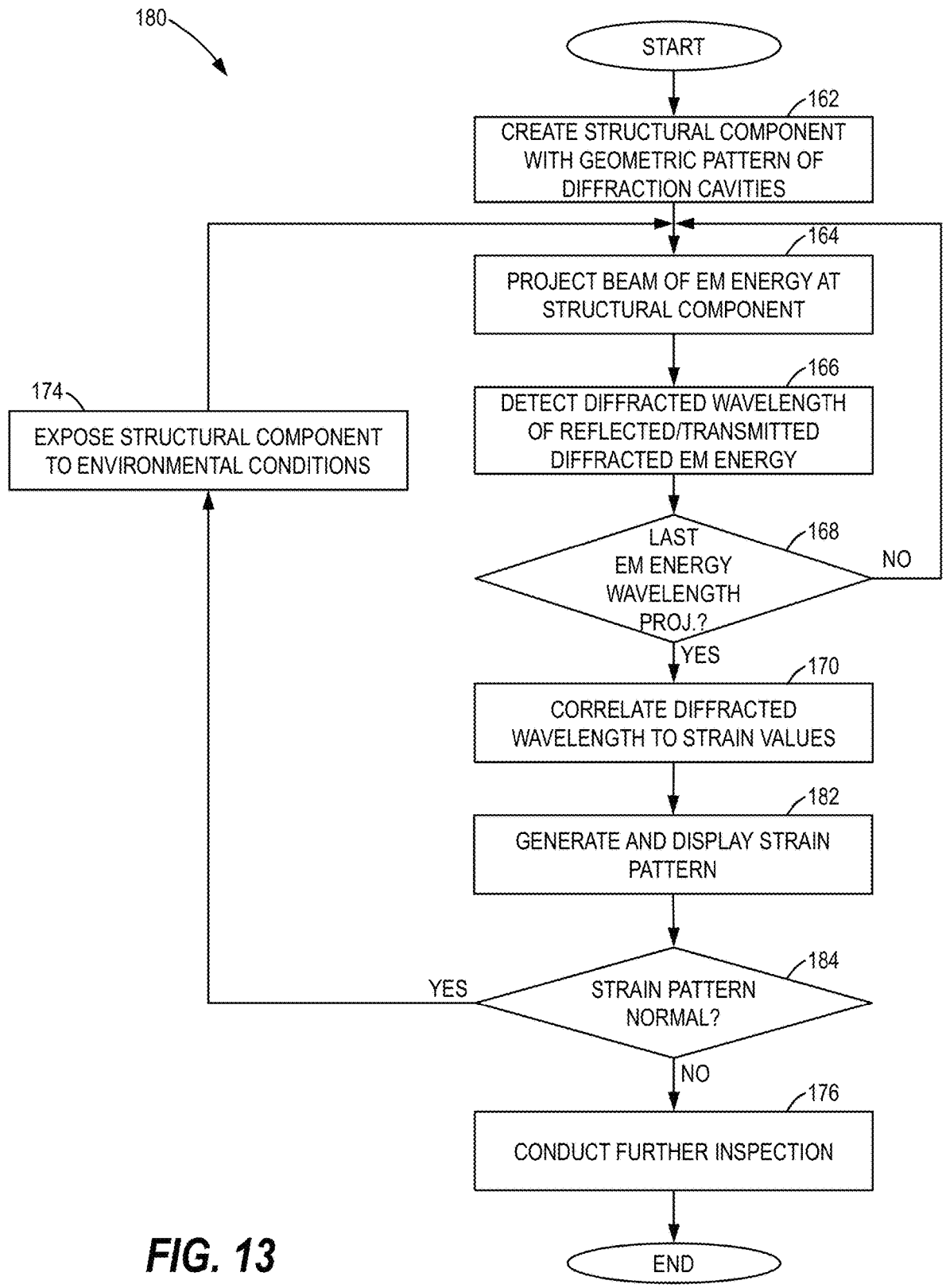
FIG. 13 is a flow diagram of an alternative embodiment of an inspection routine in accordance with the present disclosure.

The inspection routine 160 of FIG. 12 is an example of a quantitative process for evaluating the strain in the structural components 10, 30, 50, 100 and identifying when further inspection, maintenance or replacement may be required. In some implementation, it may be appropriate to substitute for or supplement the quantitative inspection routine 160 with a qualitative process wherein the experience of inspectors performing the inspection may be used to analyze a strain pattern in the structural components 10, 30, 50, 100 and identify abnormalities in the strain pattern that may require further inspection. FIG. 13 illustrates a flow diagram of an exemplary qualitative inspection routine 180 that may be performed on the structural components 10, 30, 50, 100 by the inspection system 110 and an inspector, engineer or other inspection technician utilizing the inspection system 110. The inspection routine 180 may begin in a similar manner as the inspection routine 160 wherein the structural component 10, 30, 50, 100 is created with the geometric pattern 12, 12A-12G of diffraction cavities 14, 14A-14G at the block 162, beams 142 of EM energy are projected onto the structural component 10, 30, 50, 100 at the block 164, beams 144 of diffracted EM energy are detected at the block 166, and the diffracted wavelengths from the beams 144 of diffracted EM energy are correlated to strains in the structural component 10, 30, 50, 100 at the block 170.

To implement the inspection routine 180, the inspection system 110 may be modified at blocks 164, 166, 170 to identify locations of the beams 142, 144 relative to the inspected structural component 10, 30, 50, 100 as the beams 142 are projected over the surface of the structural component 10, 30, 50, 100. Known techniques for determining locations and movements of a body or device such as the structural component 10 as it moves relative to the inspection workstation 140 of FIG. 10 or the portable inspection device 150 of FIG. 11 as it moves past the surface of the structural component 10, for example. The location information for the beams 144 of diffracted EM energy may be stored at the memory 116 along with the diffracted wavelengths detected at the block 166 and the correlated strain values determined at the block 170.

Figure 14:
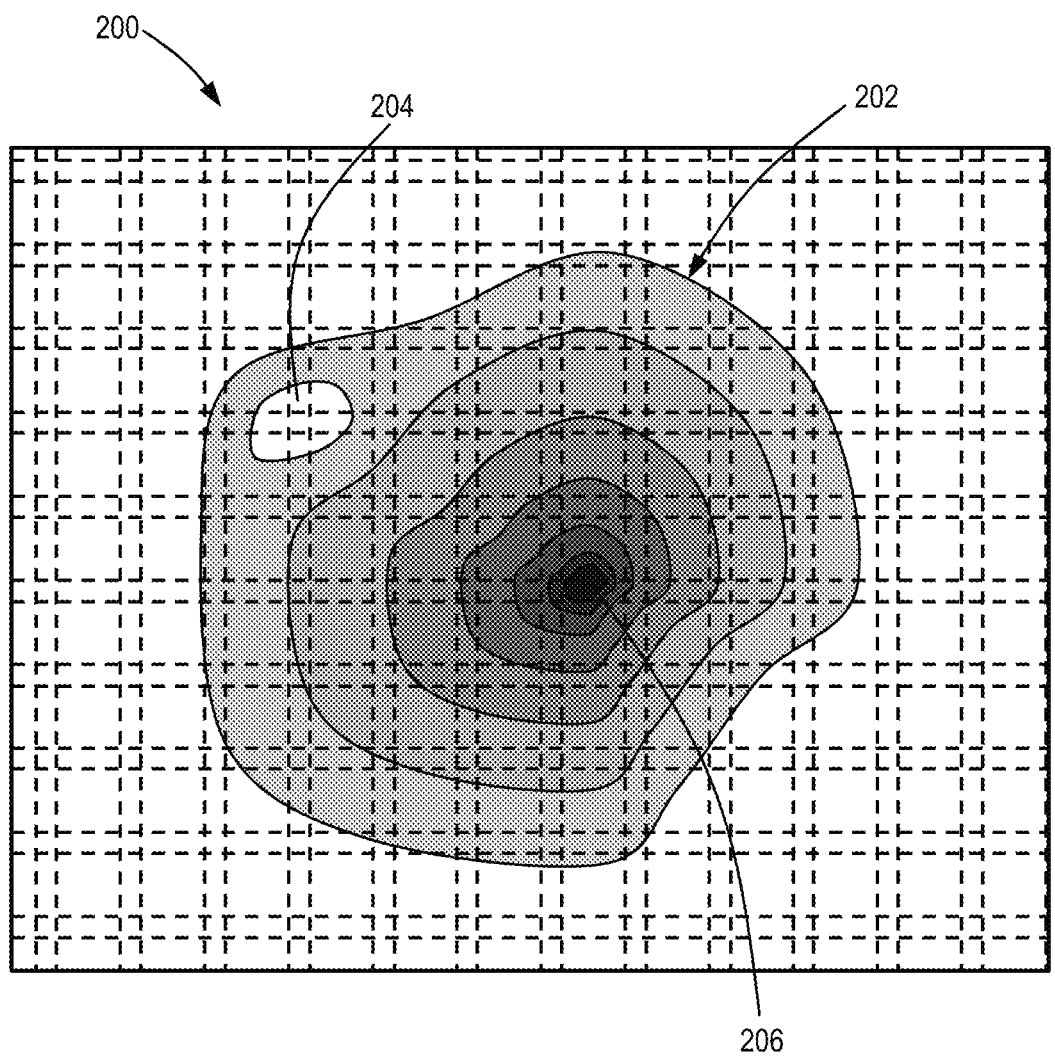
FIG. 14 is a diagram of an exemplary strain pattern display in accordance with the present disclosure.

After the diffracted wavelengths are detected and the strain values are determined, or dynamically as the inspection system 110 is inspecting the structural component 10, 30, 50, 100, control may pass to a block 182 to generate and display a strain pattern for the inspected structural component 10, 30, 50, 100 using the diffracted wavelengths, the strain values and the locations of the beams 144 relative to the structural component 10, 30, 50, 100. FIG. 14 illustrates an example of a display 200 of a strain pattern 202 that may be derived from the information acquired by the inspection system 110. The display 200 may be any appropriate visual display that conveys a graphical representation of the strains in the structural component 10, 30, 50, 100. For example, the display 200 may be a video display at one of the output devices 136 at the inspection workstation 140, the portable inspection device 150, the central inspection workstation 152 or other location where an inspector may view the display 200. In alternative embodiments, the display 200 may be a printout output by one of the output devices 136 at an appropriate location. Further, alternative visual display output devices 136 for displaying the strain pattern 202 will be apparent to those skilled in the art and are contemplated by the inventors.

The strain pattern 202 is a visual representation of the distribution of strain values across the inspected structural component 10, 30, 50, 100. In the illustrated example, the display of the strain pattern 202 utilizes grayscale shading to depict the locations and magnitudes of the strain values in the structural component 10, 30, 50, 100. White or lighter gray shades may indicate low strain areas, and the gray shading may darken as the strain values increase. The spacing between the shaded areas provides an indication of the rate of change of the strain values across the structural component 10, 30, 50, 100. In alternative embodiments, the strain pattern may be color coded. For example, blue may corresponding to low strain values and the colors may progress through the color spectrum to red which may represent high strain values. In other embodiments, the strain pattern may be presented as lines of constant strain values having appearances similar to weather maps showing barometric pressure changes or topographical maps showing elevation changes. Further alternative depiction strategies are contemplated.

In some embodiments where grayscale or the color spectrum are used, a scale may be added to the display 200 to indicate the strain values corresponding to the various shades or colors in the strain pattern 202. The display 200 may further display a minimum strain value at minimum strain area 204 (e.g., lighter color or shading), and a maximum strain value at a maximum strain area 206 (e.g., darker color or shading). Other representations may be used such as different colors to represent different strain value ranges, etc. The display 200 may further be enhanced by displaying the strain pattern 202 overlaying a captured image or graphical representation of the structural component 10, 30, 50, 100 and positioned on the image to more clearly illustrate the location of the strain pattern on the structural component 10, 30, 50, 100.

With the strain pattern 202 generated and displayed on the display 200 at the block 182, control may pass to a block 184 where an inspector, maintenance person or other technician may review the strain pattern 202 to determine whether the strain pattern 202 is normal for the environmental conditions to which the structural component 10, 30, 50, 100 has been subjected. The inspector may reference their experience in inspecting the current and/or other structural components in evaluating whether the strain pattern 202 has the characteristics that should be expected, or whether the strain pattern 202 indicates that issues may exist requiring additional inspection. The evaluation may include reviewing baseline information collected for the structural component 10, 30, 50, 100 of the type discussed above. The baseline information may be presented in any appropriate format. In some implementations, the baseline information may be used to generate a baseline strain pattern that may be displayed at the display 200 as a supplement to the real time strain pattern 202 to provide a visual comparison.

If the inspector determines at the block 184 that the strain pattern 202 is normal, the strain values illustrated in the strain pattern 202 are not greater than or less than strain values that would indicate issues exist, and further inspection is not otherwise required, control may pass to the block 174 where the structural component 10, 30, 50, 100 is exposed to environmental conditions as discussed above. After the exposure at the block 174, control may pass back to the block 164 to initiate another instance of inspecting the structural component 10, 30, 50, 100. The strain pattern 202 being different than expected in strain values that are either greater than expected or less than expected at the block 184 can indicate that further inspection, maintenance or replacement of the structural component 10, 30, 50, 100 may be necessary. If the strain pattern 202 is not normal relative to an expected strain pattern for the structural component 10, 30, 50, 100 at the block 184, control passes to the block 176 to conduct further inspection of the structural component 10, 30, 50, 100. As discussed above, the qualitative inspection routine 180 may be implemented as either an alternative or a supplement to the quantitative inspection routine 160 of FIG. 12.

INDUSTRIAL APPLICABILITY

The inspection system 110 and the routine 160 may have broad application in assessing the structural integrity of structural components having diffraction cavities in accordance with the present disclosure in mechanical systems. For example, the inspection system 110 and the routine 160 may be used in a repair monitoring application to ensure the quality of the bond of a repair such as the patch 102 of FIG. 8 to the structural component 100, and the response of the patch 102 to stress and strain over time before the structural component 100 is replaced. If the geometric pattern 12C is created on the patch 102 before the patch 102 is applied to the structural component 100 and located proximate the bond line between the structural component 100 and the patch 102, strains due to bonding can be imaged and analyzed according to the routine 160 to detect residual stresses in the patch 102 and the quality of the bond of the patch 102 to the structural component 100. A baseline image of the patch 102 before the structural component 100 with the patch 102 is exposed to environmental conditions may show any initial strain in the patch 102 and the structural component 100, and periodic imaging after the structural component 100 is exposed to the environmental conditions will monitor the quality and integrity of the bond and the patch 102, and indicate degradation in the repair over time. The strain values derived through the inspection system 110 and the routine 160 may be input into a finite element analysis (FEA) model of the patch 102 on the structural component 100 and analyzed to provide performance assessments of the patch 102, prospective inspection schedules, and approaches to NDI and predictive maintenance and repair plans.

The inspection system 110 and the routine 160 may have application in structural testing environments. Manufacturers typically conduct subscale, mid-scale and full-scale structural testing of components and repairs to ensure proper performance in the field. Such testing can involve static and dynamic loading conditions. Several techniques are currently used in this type of structural testing. For example, strain gauges are applied to structural components as point sensors for monitoring stress and strain during the tests, but their effectiveness in detecting locations in which damage to the structural component initiates and propagates is dependent on where the strain gauges are placed on the structural component. Digital Image Correlation (DIC) may be used to provide stream mapping during structural testing, but the process can be expensive, require expertise in operation, and necessitate spraying a speckled pattern on the surface. Consequently, DIC may be used judiciously in structural testing. The inspection system 110 and the routine 160 may be used as an alternative or a supplement to the currently-used testing techniques, and can be used to monitor and measure real-time strain patterns throughout the test loading conditions. The detected strain patterns can be used to correlate analysis models, and to point to or indicate initial failure locations in the structural component being tested. As in the repair monitoring application, direct feed of the strain information into the FEA tools can provide real-time or load-level damage growth information. The damage initiation and growth information can be used to improve the structural models of the structural components and modify the structural designs.

The inspection system 110 and the routine 160 may be used to improve the fabrication process of composite components that are becoming more prevalent in mechanical systems, and in particular in aerospace systems. During manufacturing development and periodic process monitoring and fabrication of composite components, it may be beneficial to determine and track internal strains in the composite component that are created by the fabrication of the component. The internal strains may be tracked through the use of strain indicator plies in a composite component that are configured with geometric patterns 12, 12A-12G of diffraction cavities 14, 14A-14G. To create the strain indicator plies, the geometric pattern 12, 12A-12G are formed in the resin in selected plies during fabrication, or provided in an appliqué that forms a peelable ply that may be removed after the composite component is cured. The patterned strain indicator plies will show residual stresses and strains that exist in the composite component due to the curing process. The information from the patterned strain indicator plies can be used to modify the manufacturing process of the composite component to reduce warpage, predict performance and verify that the production process is still within specification.

The inspection system 110 and the routine 160 may also have application in monitoring the structural health of structural components disposed in limited access areas of their mechanical systems. Limited access structures on aircraft and other mechanical systems can be critical to structural integrity and can experience high loading. Structural health testing of such limited access structures may necessitate costly disassembly and reassembly processes. Strain witness surfaces in the form of the geometric patterns 12, 12A-12G of diffraction cavities 14, 14A-14G can be created at strategic locations within the limited access structural components during fabrication. Optical or video borescopes or small cameras and extending mechanisms can function as the EM energy source 128 or 130 and the EM energy detector 132 in the inspection system 110 and be used to detect the diffracted wavelengths in the transmitted EM energy from the geometric patterns 12, 12A-12G on the limited access structures and allow analysis of the diffracted wavelength data to detect degradation of the components and monitor slow damage growth until a repair is needed, for example. As discussed above in relation to FIG. 11, the EM energy source 130 or the EM energy detector 132 may be permanently mounted within the hard-to-reach space or deployed during inspection in a manner that does not require complete disassembly of the structural component. The other of the EM energy source 130 and the EM energy detector 132 may be positioned on the opposite side of the structural component to detect the transmitted beams 144 of EM energy. Where access allows, the EM energy inspection can be combined with other NDI methods, such as infrared thermography or terahertz imaging, to provide an improved assessment and disposition of the limited access components. This and the foregoing applications of the inspection system 110 and the routine 160 are exemplary, and additional applications are contemplated by the inventors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A structural component comprising:
a first outer surface;
a second outer surface; and
a first geometric pattern of diffraction cavities formed by first surfaces within the structural component, the first geometric pattern of diffraction cavities having a first set of diffraction cavities spaced from each other by a first cavity spacing distance, wherein the diffraction cavities are unfilled spaces within the structural component, and wherein a first projected beam of electromagnetic (EM) energy having a first wavelength corresponding to the first cavity spacing distance is diffracted when the first projected beam of EM energy hits the first set of diffraction cavities and creates a first diffracted beam of diffracted EM energy having a first diffracted wavelength indicating changes in the first cavity spacing distance due to strain caused when the structural component is exposed to an environmental condition, wherein the first geometric pattern of diffraction cavities is a two-dimensional geometric pattern, wherein each of the diffraction cavities of the first set of diffraction cavities is an elongated cavity that defines the same geometric shape, wherein the geometric shapes defined by the diffraction cavities are arranged concentrically about a center of the two-dimensional geometric pattern, and wherein an area of the geometric shape defined by each of the diffraction cavities increases as a distance from the center of the two-dimensional geometric pattern to the diffraction cavities increases.

2. The structural component according to claim 1, wherein the first geometric pattern of diffraction cavities reflects the first projected beam of EM energy passing through the structural component to transmit the first diffracted beam of diffracted EM energy through the first outer surface.

3. The structural component according to claim 1, when the first projected beam of EM energy passes through the first outer surface to the first geometric pattern of diffraction cavities, and the first diffracted beam of diffracted EM energy passes through the second outer surface and out of the structural component.

4. The structural component according to claim 1, wherein the first cavity spacing distance between adjacent diffraction cavities of the first geometric pattern increases as the first geometric pattern extends outward from a central point.

5. A structural component comprising:
a first outer surface;
a second outer surface; and
a first geometric pattern of diffraction cavities formed by first surfaces within the structural component, the first geometric pattern of diffraction cavities having a first set of diffraction cavities spaced from each other by a first cavity spacing distance, wherein the diffraction cavities are unfilled spaces within the structural component, and wherein a first projected beam of electromagnetic (EM) energy having a first wavelength corresponding to the first cavity spacing distance is diffracted when the first projected beam of EM energy hits the first set of diffraction cavities and creates a first diffracted beam of diffracted EM energy having a first diffracted wavelength indicating changes in the first cavity spacing distance due to strain caused when the structural component is exposed to an environmental condition; and
a second geometric pattern of diffraction cavities formed by second surfaces within the structural component between the first geometric pattern of diffraction cavities and the second outer surface, the second geometric pattern of diffraction cavities having a second set of diffraction cavities spaced from each other by a second cavity spacing distance that is different than the first cavity spacing distance, wherein a second projected beam of EM energy having a second wavelength corresponding to the second cavity spacing distance is diffracted when the second projected beam of EM energy hits the second set of diffraction cavities and creates a second diffracted beam of diffracted EM energy having a second diffracted wavelength indicating changes in the second cavity spacing distance due to the strain caused when the structural component is exposed to the environmental condition.

6. The structural component according to claim 5, wherein the second cavity spacing distance is greater than the first cavity spacing distance and the second wavelength is greater than the first wavelength so that the second projected beam of EM energy passes through the first geometric pattern of diffraction cavities without being diffracted.

7. A structural component comprising:
a first outer surface;
a second outer surface; and
a first geometric pattern of diffraction cavities formed by first surfaces within the structural component, the first geometric pattern of diffraction cavities having a first set of diffraction cavities spaced from each other by a first cavity spacing distance, wherein the diffraction cavities are unfilled spaces within the structural component, and wherein a first projected beam of electromagnetic (EM) energy having a first wavelength corresponding to the first cavity spacing distance is diffracted when the first projected beam of EM energy hits the first set of diffraction cavities and creates a first diffracted beam of diffracted EM energy having a first diffracted wavelength indicating changes in the first cavity spacing distance due to strain caused when the structural component is exposed to an environmental condition, wherein the first geometric pattern of diffraction cavities comprises a two-dimensional geometric pattern having a second set of diffraction cavities each having a second cavity spacing distance and spaced in a second direction that is not parallel to a first direction in which the first set of diffraction cavities is spaced.

8. The structural component according to claim 7, wherein the second cavity spacing distance is not equal to the first cavity spacing distance, wherein a second projected beam of EM energy having a second wavelength corresponding to the second cavity spacing distance is diffracted when the second projected beam of EM energy hits the second set of diffraction cavities and creates a second diffracted beam of diffracted EM energy having a second diffracted wavelength indicating changes in the second cavity spacing distance due to the strain caused when the structural component is exposed to the environmental condition.

9. A structural component comprising:
a first outer surface;
a second outer surface; and
a first geometric pattern of diffraction cavities formed by first surfaces within the structural component, the first geometric pattern of diffraction cavities having a first set of diffraction cavities spaced from each other by a first cavity spacing distance, wherein the diffraction cavities are unfilled spaces within the structural component, and wherein a first projected beam of electromagnetic (EM) energy having a first wavelength corresponding to the first cavity spacing distance is diffracted when the first projected beam of EM energy hits the first set of diffraction cavities and creates a first diffracted beam of diffracted EM energy having a first diffracted wavelength indicating changes in the first cavity spacing distance due to strain caused when the structural component is exposed to an environmental condition, wherein the first geometric pattern of diffraction cavities has a second set of diffraction cavities each having a second cavity spacing distance, wherein a second projected beam of EM energy having a second wavelength corresponding to the second cavity spacing distance is diffracted when the second projected beam of EM energy hits the second set of diffraction cavities and creates a second diffracted beam of diffracted EM energy having a second diffracted wavelength indicating changes in the second cavity spacing distance due to the strain caused when the structural component is exposed to the environmental condition.

10. An inspection system for assessing strain in a structural component, comprising:
a first geometric pattern of diffraction cavities within the structural component having a first set of diffraction cavities spaced from each other by a first cavity spacing distance, wherein the diffraction cavities are unfilled spaces within the structural component;
a first electromagnetic (EM) energy source projecting a first projected beam of EM energy at a first wavelength that corresponds to the first cavity spacing distance, wherein, when the first projected beam of EM energy is projected onto the structural component, the first projected beam of EM energy passes through the structural component to the first geometric pattern of diffraction cavities, and is diffracted by the first set of diffraction cavities to create a first diffracted beam of diffracted EM energy having a first diffracted wavelength indicating changes in the first cavity spacing distance due to the strain caused when the structural component is exposed to an environmental condition;
an EM energy detector detecting the first diffracted wavelength of the first diffracted beam of diffracted EM energy from the first set of diffraction cavities as the first EM energy source projects the first projected beam of EM energy onto the structural component; and
a processor operatively connected to the EM energy detector and configured to receive the first diffracted wavelength of the first diffracted beam of diffracted EM energy from the EM energy detector and to correlate the first diffracted wavelength to the strain in the structural component.

11. The inspection system according to claim 10, wherein the first geometric pattern of diffraction cavities reflects the first projected beam of EM energy to transmit the first diffracted beam of diffracted EM energy back through the structural component, and wherein the first EM energy source and the EM energy detector are positioned on the same side of the structural component.

12. The inspection system according to claim 10, wherein the first diffracted beam of diffracted EM energy is transmitted through the structural component on an opposite side of the first geometric pattern of diffraction cavities from the first projected beam of EM energy, and wherein the first EM energy source and the EM energy detector are positioned on opposite sides of the structural component.

13. The inspection system according to claim 10, wherein the first geometric pattern of diffraction cavities has a second set of diffraction cavities spaced from each other by a second cavity spacing distance, wherein the inspection system comprises a second EM energy source projecting a second projected beam of EM energy at a second wavelength that corresponds to the second cavity spacing distance, wherein, when the second projected beam of EM energy is projected onto the structural component, the second projected beam of EM energy passes through the structural component to the first geometric pattern of diffraction cavities, and is diffracted by the second set of diffraction cavities to create a second diffracted beam of diffracted EM energy having a second diffracted wavelength indicating changes in the second cavity spacing distance due to the strain caused when the structural component is exposed to the environmental condition,
   wherein the second diffracted wavelength of the second diffracted beam of diffracted EM energy reflected from the second set of diffraction cavities is detected by the EM energy detector as the second EM energy source projects the second projected beam of EM energy onto the structural component, and
   wherein the processor is configured to receive the second diffracted wavelength of the second diffracted beam of diffracted EM energy from the EM energy detector and to correlate the second diffracted wavelength to the strain in the structural component.

14. The inspection system according to claim 10, comprising:
   a second geometric pattern of diffraction cavities within the structural component at a different depth from an outer surface of the structural component than the first geometric pattern of diffraction cavities, the second geometric pattern of diffraction cavities having a second set of diffraction cavities spaced from each other by a second cavity spacing distance; and
   a second EM energy source projecting a second projected beam of EM energy at a second wavelength that corresponds to the second cavity spacing distance, wherein, when the second projected beam of EM energy is projected onto the structural component, the second projected beam of EM energy passes through the structural component to the second geometric pattern of diffraction cavities, and is diffracted by the second set of diffraction cavities to create a second diffracted beam of diffracted EM energy having a second diffracted wavelength indicating changes in the second cavity spacing distance due to the strain caused when the structural component is exposed to the environmental condition,
   wherein the second diffracted wavelength of the second diffracted beam of diffracted EM energy reflected from the second set of diffraction cavities is detected by the EM energy detector as the second EM energy source projects the second projected beam of EM energy onto the structural component, and
   wherein the processor is configured to receive the second diffracted wavelength of the second diffracted beam of diffracted EM energy from the EM energy detector and to correlate the second diffracted wavelength to the strain in the structural component.

15. The inspection system according to claim 14, wherein the second cavity spacing distance is greater than the first cavity spacing distance and the second wavelength is greater than the first wavelength so that the second projected beam of EM energy passes through the first set of diffraction cavities without being diffracted.

16. The inspection system according to claim 10, wherein the first geometric pattern of diffraction cavities comprises a two-dimensional geometric pattern having the first set of diffraction cavities spaced in a first direction and a second set of diffraction cavities spaced in a second direction that is not parallel to the first direction.

17. The inspection system according to claim 16, wherein the first set of diffraction cavities has the first cavity spacing distance and the second set of diffraction cavities has a second cavity spacing distance that is not equal to the first cavity spacing distance, wherein the first EM energy source projects a second projected beam of EM energy having a second wavelength corresponding to the second cavity spacing distance, wherein the second projected beam of EM energy is diffracted by the second set of diffraction cavities to create a second diffracted beam of diffracted EM energy having a second diffracted wavelength indicating changes in the second cavity spacing distance due to the strain caused when the structural component is exposed to the environmental condition, wherein the second diffracted wavelength of the second diffracted beam of diffracted EM energy reflected from the second set of diffraction cavities is detected by the EM energy detector as the first EM energy source projects the second projected beam of EM energy onto the structural component, and wherein the processor is configured to receive the second diffracted wavelength of the second diffracted beam of diffracted EM energy from the EM energy detector and to correlate the second diffracted wavelength to the strain in the structural component.

18. The inspection system according to claim 10, comprising a portable inspection device containing the first EM energy source and the EM energy detector, and transmitting the first diffracted wavelength of the first diffracted beam of diffracted EM energy to the processor via wireless communications.

19. A method for assessing strain in a structural component having a first geometric pattern of diffraction cavities within the structural component, the first geometric pattern of diffraction cavities having a first set of diffraction cavities each having a first cavity spacing distance, wherein the diffraction cavities are unfilled spaces within the structural component, the method for assessing strain comprising:
   projecting a first projected beam of electromagnetic (EM) energy through the structural component to the first geometric pattern of diffraction cavities, wherein the first projected beam of EM energy has a first wavelength that corresponds to the first cavity spacing distance, and wherein the first set of diffraction cavities diffracts the first projected beam of EM energy to create a first diffracted beam of diffracted EM energy having a first diffracted wavelength indicating changes in the first cavity spacing distance due to strain caused when the structural component is exposed to an environmental condition;
   detecting the first diffracted wavelength of the first diffracted beam of diffracted EM energy from the first set of diffraction cavities as the first projected beam of EM energy is projected onto the structural component; and
   correlating the first diffracted wavelength of the first diffracted beam of diffracted EM energy from the first geometric pattern of diffraction cavities to the strain in the structural component.

20. The method for assessing strain according to claim 19, wherein the
   first geometric pattern of diffraction cavities has a second set of diffraction cavities each having a second cavity spacing distance, and wherein the method for assessing strain comprises:
   projecting a second projected beam of EM energy through the structural component to the first geometric pattern of diffraction cavities, wherein the second projected beam of EM energy has a second wavelength that corresponds to the second cavity spacing distance, and wherein the second set of diffraction cavities diffracts the second projected beam of EM energy to create a second diffracted beam of diffracted EM energy having a second diffracted wavelength indicating changes in the second cavity spacing distance due to the strain caused when the structural component is exposed to the environmental condition;

detecting the second diffracted wavelength of the second diffracted beam of diffracted EM energy from the second set of diffraction cavities as the second projected beam of EM energy is projected onto the structural component; and correlating the second diffracted wavelength of the second diffracted beam of diffracted EM energy from the second set of diffraction cavities to the strain in the structural component.

21. The method for assessing strain according to claim 19, comprises:

projecting the first projected beam of EM energy onto the structural component a first time before the structural component is exposed to the environmental condition;

detecting a baseline diffracted wavelength of the first diffracted beam of diffracted EM energy from the first set of diffraction cavities as the first projected beam of EM energy is projected onto the structural component the first time;

projecting the first projected beam of EM energy onto the structural component a second time after the structural component is exposed to the environmental condition;

detecting the first diffracted wavelength of the first diffracted beam of diffracted EM energy from the first set of diffraction cavities as the first projected beam of EM energy is projected onto the structural component the second time; and comparing the first diffracted wavelength of the first diffracted beam of diffracted EM energy to the baseline diffracted wavelength as the first projected beam of EM energy is projected onto the structural component the second time to determine changes in the strain at corresponding locations of the structural component.

22. The method for assessing strain according to claim 19, wherein the structural component has a second geometric pattern of diffraction cavities within the structural component at a different depth from a surface of the structural component than the first geometric pattern of diffraction cavities, the second geometric pattern of diffraction cavities having a second set of diffraction cavities each having a second cavity spacing distance, the method for assessing strain comprises:

projecting a second projected beam of EM energy through the structural component to the second geometric pattern of diffraction cavities, wherein the second projected beam of EM energy has a second wavelength that corresponds to the second cavity spacing distance, and wherein the second set of diffraction cavities diffracts the second projected beam of EM energy to create a second diffracted beam of diffracted EM energy having a second diffracted wavelength indicating changes in the second cavity spacing distance due to the strain caused when the structural component is exposed to the environmental condition;

detecting the second diffracted wavelength of the second diffracted beam of diffracted EM energy from the second geometric pattern of diffraction cavities as the second projected beam of EM energy is projected onto the structural component; and correlating the second diffracted wavelength of the second diffracted beam of diffracted EM energy from the second geometric pattern of diffraction cavities to the strain in the structural component.

23. The method for assessing strain according to claim 19, wherein the first set of diffraction cavities reflects the first projected beam of EM energy to transmit the first diffracted beam of diffracted EM energy back through the structural component, and wherein the method for assessing strain comprises projecting the first projected beam of EM energy onto the structural component and detecting the first diffracted wavelength on the same side of the structural component.

24. The method for assessing strain according to claim 19, wherein the first diffracted beam of diffracted EM energy is transmitted through the structural component on an opposite side of the first geometric pattern of diffraction cavities from the first projected beam of EM energy, and the method for assessing strain comprises projecting the first projected beam of EM energy onto the structural component and detecting the first diffracted wavelength on opposite sides of the structural component.

25. The method for assessing strain according to claim 19, comprising: comparing the strain on the structural component to a minimum strain value; and conducting further inspection of the structural component in response to determining that the strain on the structural component is greater than the minimum strain value.

26. The method for assessing strain according to claim 19, comprising:

generating and displaying a strain pattern derived from the strain in the structural component, wherein the strain pattern is a graphical representation of strain values in an inspected area of the structural component; and conducting further inspection of the structural component in response to determining that the strain pattern is different than an expected strain pattern on the structural component.

\* \* \* \* \*